Feb. 3, 1959  D. S. DENCE  2,871,724
VEHICLE DRIVE MEANS
Filed Feb. 25, 1954  3 Sheets-Sheet 1

INVENTOR.
DONALD S. DENCE
BY Kenneth C. Witt
ATTY.

INVENTOR.
DONALD S. DENCE
BY
Kenneth C. Witt
ATTY.

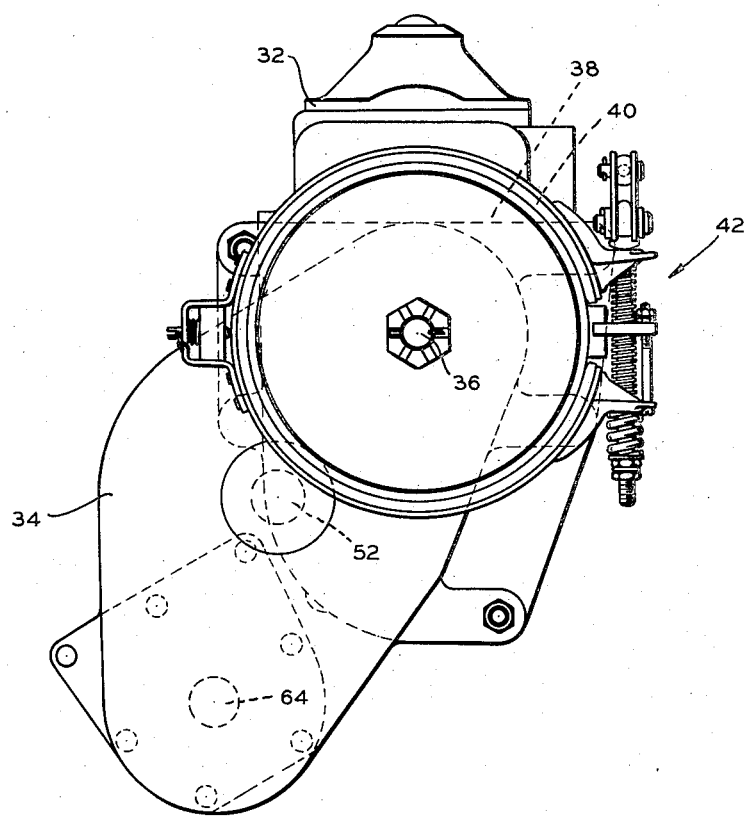

United States Patent Office 2,871,724
Patented Feb. 3, 1959

2,871,724

VEHICLE DRIVE MEANS

Donald S. Dence, Jackson, Mich., assignor to Clark Equipment Company, a corporation of Michigan Application February 25, 1954, Serial No. 412,419

8 Claims. (Cl. 74—665)

My present invention relates generally to vehicle drive means, and, more particularly, to a front and rear axle drive assembly for a vehicle.

In providing a vehicle with four-wheel drive, the front and rear axles of the vehicles are each driven by an individual propeller shaft. The propeller shafts are, in turn, conventionally driven at identical speeds from the vehicle transmission. Since there may be a difference in effective diameters of the front and rear tires of a vehicle, due primarily to a difference in the loads imposed thereon, the operation of the vehicle is inefficient when the four wheels are driven at identical speeds.

It is an object of my present invention to provide a four-wheel drive mechanism wherein the front wheels are driven at a slower speed than the rear wheels.

In accomplishing the foregoing object, I provide the gears at the adjacent ends of the propeller shafts with different numbers of teeth and arrange the gears so that they are driven from a common power driven gear. As a result, the propeller shaft gears are driven at different speeds. Specifically, the front propeller shaft gear is formed with more teeth than the rear propeller shaft gear so that the front propeller shaft and associated wheels are caused to be driven at a slower speed than the rear propeller shaft and associated wheels. In one embodiment of my invention, the propeller shaft gears are arranged in axial alignment, while in a modified embodiment, they are offset laterally.

It is another object of my present invention to provide means whereby drive to the front axle may be disestablished whenever desired.

Now in order to acquaint those skilled in the art with the manner of construction and using four-wheel drive mechanisms in accordance with the principles of my present invention, I shall describe in connection with the accompanying drawings preferred embodiments of my invention.

In the drawings:

Figure 3 is an end view of the mechanism of Figure 2 and shows the geometric arrangement of the shafts thereof.

Figure 1:
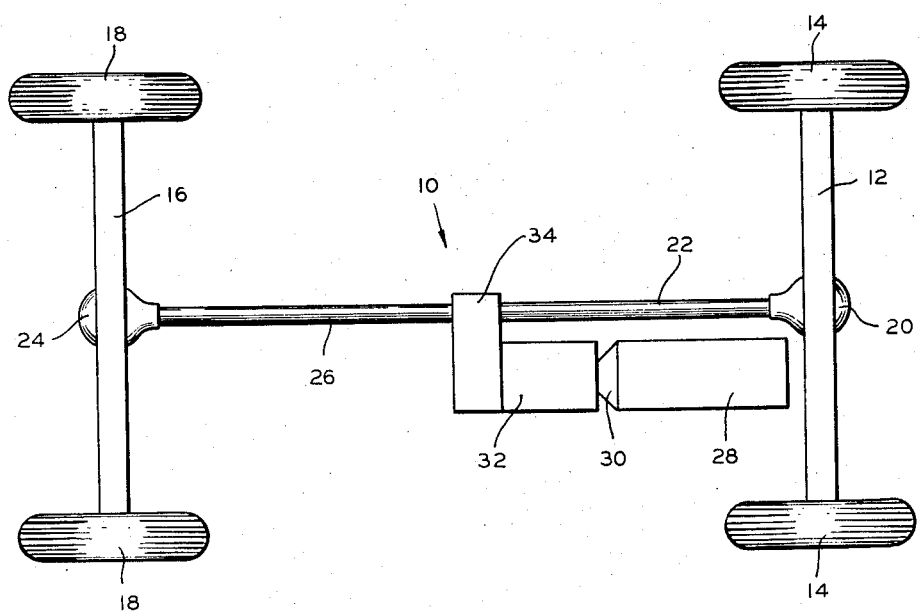
Figure 1 is a diagrammatic view of vehicle drive means embodying my present invention.
Figure 2:
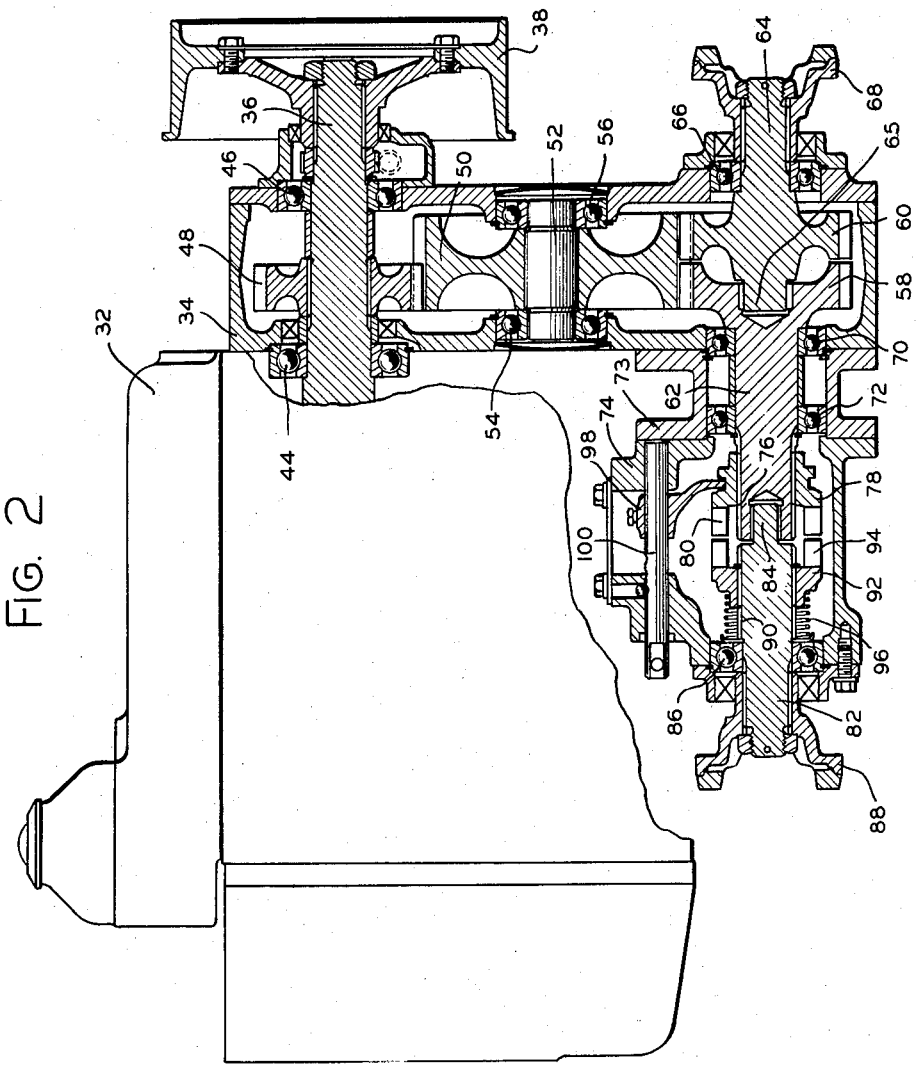
Figure 2 is a vertical sectional view of the gear arrangement of one embodiment of my present invention with the shafts shown revolved out of their normal positions for the sake of clarity.

Referring now to Figures 1 through 3, I shall describe one embodiment of my present invention. Indicated generally by the reference numeral 10 in Figure 1 is a vehicle driving system comprising a transverse front axle 12 having wheels 14 at the ends thereof, and a transverse rear axle 16 having wheels 18 at the ends thereof. The front axle 12 has driving connection through a differential 20 with a lengthwise front propeller shaft 22, and the rear axle 16 has driving connection through a differential 24 with a lengthwise rear propeller shaft 26. It is assumed for the purpose of this disclosure that differentials 20 and 24 provide the same ratio or gear reduction between their respective propeller shafts and axle shafts, with axles 12 and 16 respectively, whereby the ratio between the speeds of propeller shaft 22 and wheels 14 is the same as the ratio between the speeds of propeller shaft 26 and wheels 18.

The front and rear propeller shafts 22 and 26 are adapted to be driven by prime mover means 28, which may comprise an internal combustion engine, clutch means 30, transmission means 32, and auxiliary drop-type gear train means arranged in a housing 34. The propeller shafts 22 and 26 lie below the transmission means 32.

As shown in Figure 2, the transmission means 32 has a horizontal output shaft 36 which extends through the upper end of the gear train housing 34. The rear end of the output shaft 36 has secured thereon a brake drum 38 which, as shown in Figure 3, has a brake band 40 and brake actuating means 42 associated therewith. Since the brake actuating means 42 forms no part of my present invention, it is not believed necessary to describe the same in detail.

The output shaft 36 is journalled in a ball bearing assembly 44, secured in the rear end of the transmission housing, and a ball bearing assembly 46, secured in the rear end wall of the gear housing 34. Keyed to the output shaft 36, intermediate of the bearing assemblies 44 and 46, is a gear 48 which has meshing engagement with a power driven gear 50 journalled on a countershaft 52. Secured in the front and rear walls of the gear housing 34 are ball bearing assemblies 54 and 56 which support the ends of the countershaft 52.

In the preferred embodiment of my invention, the countershaft gear 50 meshes with a pair of axially aligned gears 58 and 60 which are formed, respectively, at the ends of forwardly and rearwardly extending stub shafts 62 and 64. As shown in Figure 3, the axis of the countershaft 52 lies below, and to one side of, the axis of the transmission output shaft 36, and the axis of the stub shafts 62 and 64 lies below, and to one side of, the axis of the countershaft 52. The rear stub shaft 64 is journalled in a ball bearing assembly 66, retained in the rear end wall of the gear housing 34, and in addition has a reduced diameter pilot bearing portion 65 which is journalled in a suitable opening in gear 58. Stub shaft 64 has keyed thereto a connector 68, which, as will be understood in the art, meshes with a mating connector secured to the adjacent end of the rear propeller shaft 26.

The forward stub shaft 62 is journalled in a pair of ball bearing assemblies 70 and 72; the bearing assembly 70 being retained in the front wall of the gear housing 34 and the bearing assembly 72 being retained in a sleeve member 73 which connects an auxiliary housing 74 to housing 34. The forward end of the stub shaft 62 is splined at 76 and mounted for axial movement thereon is a clutch collar member 78 having axially projecting teeth 80.

A secondary stub shaft 82 is formed with a reduced nose portion 84 that is journalled in the adjacent end of the stub shaft 62. The secondary stub shaft 82, intermediate of its ends, is also journalled in a ball bearing assembly 86 retained in the front wall of the auxiliary housing 74. The front end of the secondary stub shaft 82 has secured thereon a connection 88 which meshes with a mating connector secured to the adjacent end of the front propeller shaft 22.

Within the auxiliary housing 74, the shaft 82 is formed with splines 90 upon which is mounted for axial movement a clutch collar member 92 having axially projecting teeth 94. The clutch collar member 92 is normally biased to the position shown in Figure 2 by means of a coil spring 96.

The clutch collar member 78 is adapted to be moved axially for engaging the clutch teeth 80 with the clutch teeth 94 by means of a fork member 98 which is secured on a shift rail 100 mounted in the auxiliary housing 74. The shift rail 100 projects outwardly of the housing 74 and may be connected, through suitable linkage means, with the transmission means 32. When the clutch teeth 80 are moved toward the clutch teeth 94 the spring 96 yields so as to cushion engagement of the clutch teeth. The clutch means within the auxiliary housing 74 serves to establish and disestablish driving connection between the gear 58 and the front propeller shaft 22. Disestablishment might be desired, for example, should the vehicle be driven rearwardly.

Because of the difference in effective diameters of the front and rear tires of a vehicle, due primarily to a difference in the loads imposed thereon, I have found that vehicle efficiency is increased if the rear wheels are driven at a faster speed than the front wheels. In accordance with this discovery, I form the gears 58 and 60 with a dissimilar number of teeth so that the stub shafts 62 and 64 are driven at different speeds. Specifically, the gear 60 is formed with a lesser number of teeth than the gear 58 so that the former will be driven faster than the latter by the gear 50. I have further discovered that maximum efficiency is attained when the front axle 12 is driven approximately 4% slower than the rear axle 16. By way of exemplification, and not limitation, this 4% differential may be obtained by forming the gear 50 with 45 teeth, the gear 58 with 27 teeth, and the gear 60 with 26 teeth. It is to be understood, however, that the 4% differential may also be obtained with other proportions of gear teeth. It will be understood also that the foregoing is based on the assumption, previously stated, that axle differentials 20 and 24 provide equal ratios between the two propeller shafts and their respective wheels. Should such axle differential ratios not be equal, then the numbers of teeth on gears 58 and 60 must be changed so that the speed differential of 4% or other desired differential is provided between the front and rear wheels of the vehicle.

In the embodiment of my invention just described, it is to be noted that the gear 50 is formed with teeth of double-than-normal width so as to mesh fully with both the axially aligned gears 58 and 60.

Figure 4:
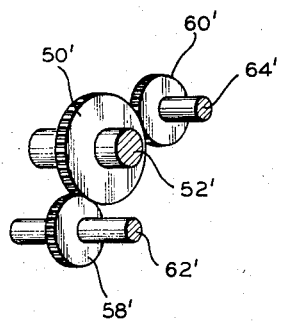
Figure 4 is a perspective view of a portion of a modified embodiment of my present invention.

In a modified embodiment of my present invention, shown in Figure 4, wherein prime reference numerals have been employed to designate those elements which are the same, or similar, to the elements described hereinbefore, the teeth of the gear 50' are of normal width. In this embodiment, the stub shafts 62' and 64' are offset laterally and are arranged at opposite sides of the axis of rotation of the gear 50' with the gears 58' and 60' correspondingly meshing with the opposite sides of the gear 50'. When the latter differential gear arrangement is employed, the propeller shafts 22 and 26 are of course offset laterally from their positions shown in Figure 1. Outside of the differences noted, the elements of the modified embodiment are the same as the elements of the first described embodiment and operate in the same manner to produce the same result.

Now, while I have shown and described what I believe to be preferred embodiments of my present invention, it will be understood that various rearrangements and modifications may be made therein without departing from the spirit and scope of my invention.

I claim:

1. For use in a vehicle having front and rear ground engaging wheels, a front propeller shaft for driving the front wheels at a predetermined ratio, a first gear drivingly connected with one end of said front propeller shaft, a rear propeller shaft for driving the rear wheels at the same ratio, a second gear drivingly connected with one end of said rear propeller shaft and having a lesser number of teeth than said first gear, and a power driven gear meshing with said first and second gears for causing said front propeller shaft to be driven at a slower speed than said rear propeller shaft.

2. For use in a vehicle having front and rear ground engaging wheels, a front propeller shaft for driving the front wheels at a predetermined ratio, a first gear drivingly connected with one end of said front propeller shaft, a rear propeller shaft for driving the rear wheels at the same ratio, a second gear drivingly connected with one end of said rear propeller shaft and having a lesser number of teeth than said first gear, a power driven gear meshing with said first and second gears, and the number of teeth of said first and second gears and said power driven gear being proportioned so that said front propeller shaft is caused to be driven at approximately a 4% slower speed than said rear propeller shaft.

3. For use in a ground vehicle, a front propeller shaft for driving the front wheels at a predetermined ratio, a rear propeller shaft aligned with said front propeller shaft for driving the rear wheels at the same said ratio, and drive means for causing said front propeller shaft to be driven at a slower speed than said rear propeller shaft.

4. For use in a ground vehicle, a front propeller shaft for driving the front wheels of the vehicle at a predetermined ratio, a first gear drivingly connected with one end of said front propeller shaft, a rear propeller shaft aligned with said front propeller shaft for driving the rear wheels at the same said ratio, a second gear drivingly connected with one end of said rear propeller shaft and having a lesser number of teeth than said first gear, and a power driven gear meshing with said first and second gears for causing said front propeller shaft to be driven at a slower speed than said rear propeller shaft.

5. For use in a vehicle having front and rear ground engaging wheels, a front propeller shaft for driving the front wheels at a predetermined ratio, a first gear drivingly connected with one end of said front propeller shaft, a rear propeller shaft aligned with said front propeller shaft for driving the rear wheels at the same said ratio, a second gear drivingly connected with one end of said rear propeller shaft and having a lesser number of teeth than said first gear, a power driven gear meshing with said first and second gears, and the number of teeth of said first and second gears and said power driven gear being proportioned so that said front propeller shaft is caused to be driven at approximately a 4% slower speed than said rear propeller shaft.

6. For use in a vehicle having front and rear ground engaging wheels, a front propeller shaft for driving the front wheels at a predetermined ratio, a first gear drivingly connected with one end of said front propeller shaft, a rear propeller shaft offset laterally from said front propeller shaft for driving the rear wheels at the same said ratio, a second gear drivingly connected with one end of said rear propeller shaft and having a lesser number of teeth than said first gear, and a power driven gear meshing with said first and second gears for causing said front propeller shaft to be driven at a slower speed than said rear propeller shaft.

7. For use in a vehicle having front and rear ground engaging wheels, a front propeller shaft for driving the front wheels at a predetermined ratio, a first gear drivingly connected with one end of said front propeller shaft, a rear propeller shaft offset laterally from said front propeller shaft for driving the rear wheels at the same said predetermined ratio, a second gear drivingly connected with one end of said rear propeller shaft and having a lesser number of teeth than said first gear, a power driven gear meshing with said first and second gears, and the number of teeth of said first and second gears and said power driven gear being proportioned so that said front propeller shaft is caused to be driven at approximately a 4% slower speed than said rear propeller shaft.

8. For use in a vehicle having front and rear ground engaging wheels, a front propeller shaft for driving the front wheels at a predetermined ratio, a first gear drivingly connected with one end of said front propeller shaft, a rear propeller shaft for driving the rear wheels at a predetermined ratio, a second gear drivingly connected with one end of the said rear propeller shaft and having a different number of teeth than the said first gear, and a power driven gear meshing with the said first and second gears for causing the said front wheels to be driven at a slower speed than the said rear wheels.

References Cited in the file of this patent

UNITED STATES PATENTS 2,107,072     Herrington _____ Feb. 1, 1938

FOREIGN PATENTS 444,074     France _____ Oct. 9, 1912